Patented Jan. 28, 1941

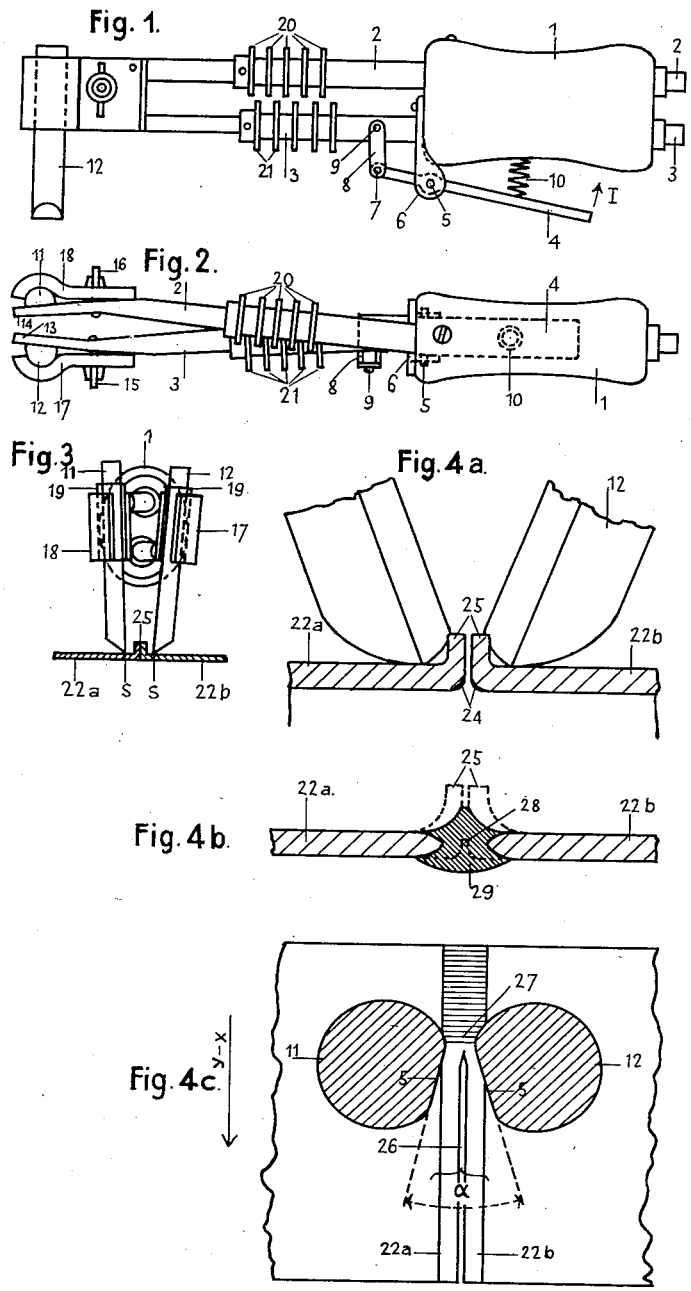

2,230,021

UNITED STATES PATENT OFFICE 2,230,021

ELECTRIC WELDING DEVICE

Alois Sigfried Weibel and Hans Weibel, Wohlen, Switzerland

Application October 19, 1938, Serial No. 235,882
In Switzerland October 23, 1937

5 Claims. (Cl. 219—4)

The object of the invention is an electrode holder for electrical resistance-welding of metals of all kinds especially thin sheets of light metals of any alloy and a characteristic feature is that two electrodes are adjustably arranged almost at right angles in a holder provided with a handle and converge in elevation towards the weld and in plan away from the direction of movement so that their mutual distance can be altered without breaking the circuit.

The electrode holder according to the invention avoids the use of an arc and the danger of overheating and the formation of oxides are also avoided because the degree of heating only amounts to a fraction of that required for the electric arc or the flame of a blow pipe and the temperature at which the metal flows best can be maintained exactly. This is of particular advantage in welding light metals the melting point of which is far below that of iron.

Furthermore when using the electrode holder according to the present invention a heavy pressure on the material being welded is not necessary as is the case in the so-called resistance-pressure-welding. Owing to the heat of the electrodes the metal is first melted down and then owing to the transitional resistance, which forms where the electrodes are nearest together, it is brought to welding heat.

For welding direct or alternating low voltages of between 3 and 7 volts at 80 to 350 amps. are used (measured by resistance). This current may be fed to the edges to be welded, which are preferably prepared by beading or bevelling them, by means of a pair of electrodes such as carbon electrodes connected to the secondary winding of a transformer.

The electrodes may be heated to the desired temperature either by short circuiting them directly without touching the work or the electrodes are placed on either side of the joint to be welded until they glow. As soon as the metal commences to flow welding may proceed by drawing the electrodes along both edges with a uniform movement. Their mutual distance may be adjusted to suit particular requirements. During welding the voltage drops as the current rises, for example to 1½ to 3 volts if the starting voltage was 6 volts. The welding speed for thin sheets is about 0.6–1 metre per minute.

An important proviso for a good weld is the form and position of the electrodes. Preferably their ends are arranged as cutting edges. During welding the electrodes are so arranged that they converge in elevation towards the joint and the cutting edges of the electrodes which slide on the surface of the material converge away from the direction of movement. In order to prevent oxidation the lower edge of the material is coated with a flux. By the above described means a homogeneous uniform joint is obtained.

As already mentioned low voltages are used so as to avoid arcing. For welding sheets 0.9 mm. thick, about 6 volts are suitable. The voltage drop during welding has the advantage that arcing and sparking do not occur if the circuit is broken, and thus the possibility of particles of the electrodes being deposited in the flowing metal is avoided which tend to set up resistance or contaminate the joint when welding is recommenced.

Tests have shown that materials welded according to this arrangement have a uniform joint at the weld and that the physical properties of the basic material are not impaired and that the heated portion is extremely small which is an extremely important feature in regard to distortion of very thin sheets.

The electrode holder is illustrated in the accompanying drawing by way of example and Fig. 1 shows the electrode holder in elevation.
Fig. 2 shows the electrode holder in plan.
Fig. 3 shows a front view, and
Figs. 4a to 4c show schematically the position of the electrodes in relation to the work and the formation of the welding joint from the flanged edges of the material on an enlarged scale.

The electrode holder illustrated in the accompanying drawing is provided with a handle 1 which is traversed by two current carrying arms 2 and 3. The arms or leads 2 and 3 are connected to a current supply, not shown. One of the two leads 2 is fixed in the handle 1 whereas the other lead is arranged to turn. A rotation of the lead 3 on its long axis is effected by the lever 4 which is movably mounted on the pivot 5 of the lug 6 fitted to the handle 1. One end of the lever 4 is pivotally connected at 7 to one end of a link 8, the other end of which is connected to a pivot 9 arranged on the lead 3. A spring 10 arranged between the lever 4 and the handle 1 holds the lever 4 in the starting position as shown by Figure 1. If the lever 4 is moved in the direction as shown by the arrow, then the lead 3 is also moved on its long axis without interrupting the welding operation. The ends of leads 2 and 3 carrying the electrodes 11 and 12 and for this purpose bars 13 and 14 are welded on the ends of said leads for the purpose of holding the clamps 17 and 18 by means of wing nuts 15 and 16. As may be seen from Figure 2, the bars 13 and 14 are set on the leads 2 and 3 in such a way that they form an obtuse angle in the direction of the handle. As may be seen from Figure 3, the electrodes 11 and 12 may also be arranged in a casing 19; carbon electrodes are advantageously provided with a copper sheating. Cooling fins 20 and 21 are fitted on the leads 2 and 3 in such a way that the turning movement of the lead 3 is not hampered. Instead of air cooling, water cooling may be used.

The electrodes are arranged at right angles on the arms and converge at their free ends to form an acute angle (Figure 3). The bevel edge formation of the carbons may also be seen in Figure 3. The carbons are flat on the sides facing one another and on their opposite sides they are substantially semi-circular.

The bevel edges s of the carbons converge in a direction opposite to the movement x—y of the carbons (Figure 4c). Owing to the two convergences the following effects are obtained: The heat is mainly concentrated at the apex of the converging angle, the formation of the weld is effected by the entrance of the bevel edges in the molten material and the electrodes, which are preferably rounded at the corner of their edges, travel uninterruptedly along the edges to be welded. If the bevel edges of the electrodes were parallel, the ends of the carbons would melt in the work owing to their temperature, thus causing a depression on the work corresponding to their shape and thus preventing the electrode holder from being moved. The bevel edges of the electrodes resting on the edges 22a and 22b may be more or less broad according to the thickness of the sheet or the shape of the material.

The convergence of the bevel edges of the electrodes may be effected in such a way that the bars attached to the leads 2 and 3 form an acute angle with one another and/or by clamping the electrodes so that the desired convergence is obtained.

The particular shape of the electrodes and their position on the edges of the material and also the effects which take place during the formation of the weld from the molten edges may be seen in Figures 4a to 4c.

The converging carbons 11 and 12 are used at right angles to the material 22a and 22b and are applied to the flanged edges 25 in such a way that their inner bevel edges rest on the material without undue pressure. Beneath the edges of the material 22a and 22b a flux paste 24 is applied to the part where the weld is to be made. In Figure 4c may be seen that the base of the carbons have a somewhat bevelled circular shape so that the edges s form an acute angle with the joint. Owing to this convergence of the edges, the greatest heat is concentrated where the carbons are nearest together, and the front or widest part of the electrode ends are prevented from touching on the edges of the material to be welded which would prevent their forward movement.

Owing to the heat of the electrodes, the material at 26 is raised to melting temperature, and at the same time the electrode holder can be moved in the direction x—y owing to the obtuse angle of the electrode ends. The result is that the pre-heated material at 26 compared with the molten material at 27 is raised to welding heat owing to the increase in transitional resistance.

Figure 4b shows that after welding, the edges 25 are melted down and that the molten material has completely and uniformly filled up the somewhat expanded centre portion 28 as far as the base of the joint 29.

For welding sheets with unflanged edges, the electrode ends are preferably blunter and broader than for other purposes. In this instance the edges of the sheets may be prepared by chamfering them for example, so as to form a V-shaped groove for the electrodes.

A material may be placed in this groove which projects slightly above the edges of the sheets, the composition of which is the same as the sheets themselves. In this case the electrodes slide along the inserted material or wire and weld it in said groove. A flux may be used with advantage.

In the arrangement according to the invention, electrodes consisting of carbon as well as those of fusible or of high melting material may be used.

When welding thin sheets, flanged edges are preferable. The edges of the sheets from which all milling scale, etc., must be removed, may be arranged at acute, obtuse or right angles and the edges of the sheets may touch each other or they may be arranged at a slight distance apart. The use of an added material such as a welding rod is advisable if the sheets are not flanged and are allowed to touch one another. When an added material is used it may serve as a guide for the electrodes, and if it touches the sheets the current will pass through it.

In order to prevent the electrodes from overheating, which would cause the material to be burnt through, it is advisable to insert an automatic regulating arrangement between the current supply and the electrodes. This prevents the maximum permissible current from being exceeded for the particular material being welded.

The electrode holder may be guided either by hand or automatically, and instead of the electrode holder being moved, the material itself may be moved along the stationary electrode holder, either by hand or automatically, or the electrode holder and material may be moved in opposite directions or alternately if desired.

From the foregoing description it will be seen that welding according to the invention, is produced by a combination of the electrically heated electrodes and the resistance heat induced by the current passing through the material.

We claim:

1. Apparatus for electrical resistance-welding of metals of all kinds especially thin sheets of light metal of any alloy, comprising two movably connected electrode holders, a handle for the holders, a hard or infusible electrode in each holder, each electrode having one side flat and terminating in a knife edge at the welding end and being arranged almost at right angles to its electrode holder, means for clamping said electrodes in the holders with their flat sides opposite each other and converging towards said edges, and means for positioning and separating the electrodes relative to one another without breaking the circuit.

2. Apparatus for electrically welding thin metal sheets of all kinds, comprising two movably connected electrode holders in which each electrode holder carries the electrode current, a handle for the holders, a tapered carbon electrode having one side flat and terminating in a knife edge mounted in each holder approximately at right angles thereto with the flat sides opposite each other and converging towards the knife edges, means for feeding the carbon electrodes with electric current, and means for altering the position and distance of the carbon electrodes without breaking the circuit.

3. Apparatus for welding thin metal sheets of all kinds, comprising a handle, a fixed current carrying member passing through the handle, a current carrying member longitudinally traversing said handle and arranged to rotate therein, a clamp at the free end of each current carrying member, each clamp having opposed flat and concave portions, a carbon electrode of flattened cylindrical cross-section in each clamp, each electrode having a knife edge in its flattened face at the welding end, said electrodes being held between said flat and concave clamp portions with its flat and curved surfaces engaging corresponding surfaces of the clamp and with the flat surfaces of the electrodes opposite each other and converging to their welding ends, a double armed lever resiliently mounted on the handle, one end of said lever being movably connected to the movable member and the other end of the said lever being so arranged on the handle to turn the movable member so that the point of the carbon electrode on the movable member approaches that on the other electrode for the purpose of altering the convergence.

4. Apparatus for electrical resistance welding thin metal articles comprising a handle, a pair of electrode arms extending longitudinally from the handle, means for connecting said arms to a current supply, electrode clamping means on each of said arms, said means having opposing curved and flat clamping surfaces, electrodes having flat and curved portions engaging and clamped between the corresponding flat and curved surfaces of said clamping means, said electrodes being bevelled substantially to sloping edges at the working ends of their flat portions, the setting of said flat clamping surfaces relatively to the arms being such that the electrodes are held with their flat portions opposite each other and converging from the apparatus to the article being welded, while viewed along the line of welding, said flat portions diverge in the direction of welding, and means for varying the separation of the sloping edges of said electrodes without interrupting the welding current.

5. Apparatus for electrical resistance welding thin metal articles comprising a handle, a pair of electrode arms extending longitudinally from the handle, means for connecting said arms to a current supply, electrode clamping means on each of said arms, electrodes having flattened portions bevelled to substantially sloping-edges at the welding ends, said electrodes being clamped in said clamping means with their flat portions opposite each other and converging from the apparatus to the place of welding while viewed along the line of welding, said flat portions diverge in the direction of welding, and means for varying the separation of the sloping edges of said electrodes without interrupting the welding current.

ALOIS SIGFRIED WEIBEL.
HANS WEIBEL.